A. McKENZIE.
Method of Manufacturing Carriage-Shackles.
No. 159,950. Patented Feb. 16, 1875.
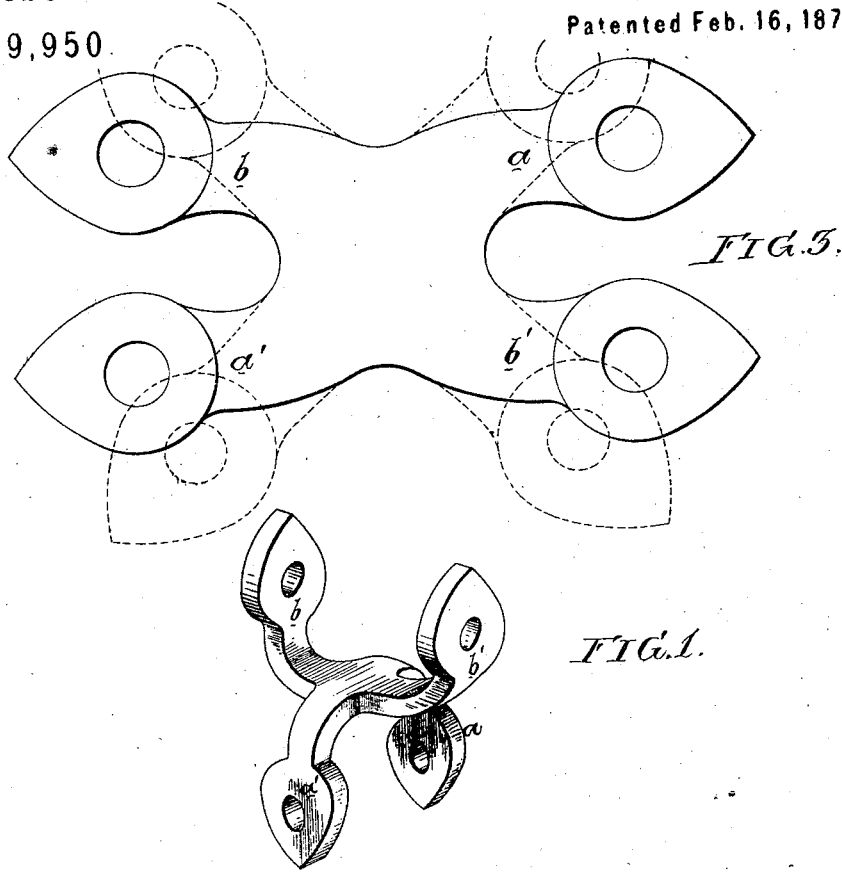
FIG. 3.
FIG. 1.
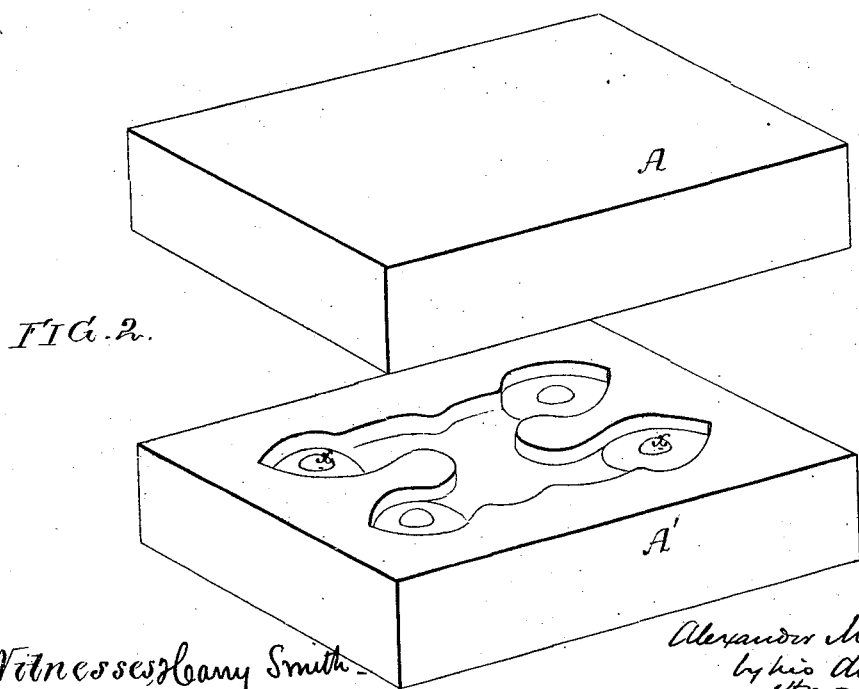
FIG. 2.
Witnesses: Harry Smith, Hubert Howson
Alexander McKenzie
by his Atty.
Howson and Son
THE GRAPHIC CO.PHOTO-LITH.39 & 41 PARK PLACE, N.Y.

UNITED STATES PATENT OFFICE.

ALEXANDER McKENZIE, OF PHILADELPHIA, PENNSYLVANIA, ASSIGNOR OF ONE-HALF HIS RIGHT TO WILLIAM EARP, OF SAME PLACE.

IMPROVEMENT IN METHODS OF MANUFACTURING CARRIAGE-SHACKLES.

Specification forming part of Letters Patent No. 159,950, dated February 16, 1875; application filed October 19, 1874.

*To all whom it may concern:*

Be it known that I, ALEXANDER McKENZIE, of Philadelphia, Pennsylvania, have invented an Improvement in the Manufacture of Spring-Shackles for Vehicles, of which the following is a specification:

The object of my invention is the ready manufacture of wrought-iron shackles of the character illustrated in Figure 1 of the accompanying drawing, these shackles being used in connection with wagons in a manner too well known to need description; and this object I attain in the manner which I will now proceed to describe, reference being had to Fig. 2, showing the dies in perspective, and to Fig. 3, which illustrates the condition of the shackle before it is bent to the desired shape.

Shackles of the form shown in Fig. 1 have heretofore been made of malleable cast-iron in one piece, or of two pieces of wrought-iron welded together. In the former case a want of durability has been experienced, owing to the character of the metal and to the severe strains to which the shackle has to be subjected, while a welded shackle is always more or less insecure.

To obviate these defects I make the shackle of one piece of wrought-iron of superior quality, or of steel, in the following manner: A and A' are two steel dies, in each of which is cut a recess of a form corresponding with that of the blank unbent shackle shown in Fig. 3. A bar of wrought-iron or steel, of the desired quality and size, is placed on the lower die, and the upper die, which may be connected to any suitable power-hammer, is caused to strike the heated bar repeated blows, the result of which is the forging of the bar portion of the bar thus acted on to a shape conforming to that of the recesses in the two dies and to Fig. 3, the metal outside the recesses of the dies, but within the limits of the same, being hammered to a comparatively thin film, or, as it is technically termed, a burr, which is removed by a punch and die of a shape conforming with that of the shackle-blank, Fig. 3. All that now remains to be done is to first bend the arms laterally, by means of a suitable tool, to the position shown by dotted lines in Fig. 3, and then to bend the arms $a$ and $a'$ in one direction, and the arms $b$ and $b'$ in the opposite direction. There are in the recesses of the dies small projections $d$, which determine the positions of the pin-holes in the arms of the shackle, and which serve to guide the drill in boring these holes.

There may be a recess of proper depth in one die only, the other die being flat; but I prefer to make corresponding recesses in the two dies.

I claim as my invention—

As an improvement in the manufacture of carriage-shackles, the mode herein described of first stamping the plain bar to the form shown in Fig. 3 of the drawing by means of dies, then removing the burrs, then bending the arms to form a cross, and finally bending the said arms to form the shackle, all as set forth.

In testimony whereof I have signed my name to this specification in the presence of two subscribing witnesses.

ALEXANDER McKENZIE.

Witnesses:
 WILLIAM EARP,
 GEORGE W. GILL.